Oct. 6, 1953

T C. NOON ET AL 2,654,553

FUEL TANK

Filed Sept. 20, 1949

Inventor
T. Cyril Noon
Robert J. Anderson

By *[signature]* Attys

Patented Oct. 6, 1953

2,654,553

UNITED STATES PATENT OFFICE 2,654,553

FUEL TANK

T Cyril Noon, Bainbridge Township, Geauga County, and Robert J. Anderson, Cleveland, Ohio, assignors to Thompson Products, Inc., Cleveland, Ohio, a corporation of Ohio Application September 20, 1949, Serial No. 116,662

5 Claims. (Cl. 244—135)

This invention relates to improvements in fuel systems, and more particularly relates to an improved fuel system adapted to supply fuel under pressure to aircraft engines.

Heretofore, in conventional aircraft fuel tanks now in use, when the fuel drops below a certain level, the fuel pump loses its prime and is unable to satisfactorily pump fuel to the engine with the result that the fuel pump can never completely empty the tank. This inability of the pump to completely empty the fuel tank is extremely disadvantageous where shallow tanks are used having a large horizontal area with respect to the height of the tank, leaving a large percentage of the fuel unavailable to operate the engine.

Also in aircraft having either shallow or deep tanks, it is often possible to maneuver the aircraft so that the force of acceleration acts on the aircraft and its contents in a direction opposite to the normal force of gravity. This is commonly called negative "G" operation. When this occurs, items not rigidly attached to the aircraft frame, such as fuel or oil in their respective tanks, move to the top of the tank rather than stay on the bottom, as is normal. Since the sump and fuel outlets from the tank are normally at the bottom of the tank, these outlets become uncovered during such negative "G" operation with the result that the supply of fuel to the engine ceases, causing a consequent undesirable loss of power and speed.

Our invention has as its principal objects to overcome these difficulties by providing a variable volume fuel tank which decreases in volume upon a predetermined drop in the level of the fuel therein and having a movable or floating fuel intake which remains submerged during all conditions of operation of the aircraft.

A more specific object of our invention is to provide a new and improved fuel system particularly adapted for use in aircraft wherein fuel in the tank is displaced upon the dropping of the fuel level in the tank, to cause a rise in the fuel level and assure substantially full utilization of the fuel in said tank.

A still further object of our invention is to provide a new and improved fuel system for use in aircraft wherein the fuel tank is provided with an expansible bladder therein, and wherein fluid connections and controls operable upon variation in the level of fuel in said tank are provided to supply fluid under pressure to expand the bladder to decrease the volume of the tank responsive to a predetermined drop in the level of fuel therein.

A still further object of our invention is to provide a new and improved fuel system for aircraft wherein a fuel intake is provided within a fuel tank to supply fuel from the tank to an aircraft engine, and wherein this fuel intake is mounted for floating movement within the tank, so as to be continually submerged in the fuel of the tank during normal and negative "G" operation of the aircraft.

A still further object of our invention is to provide a fuel system particularly adapted for use in aircraft wherein a fuel intake is horizontally pivoted within the tank to follow the fuel therein, so that its position is determined by the same forces which determine the position of the fuel within the tank.

These and other objects of our invention will appear from time to time as the following specification proceeds and with reference to the accompanying drawing wherein.

Figure 1:
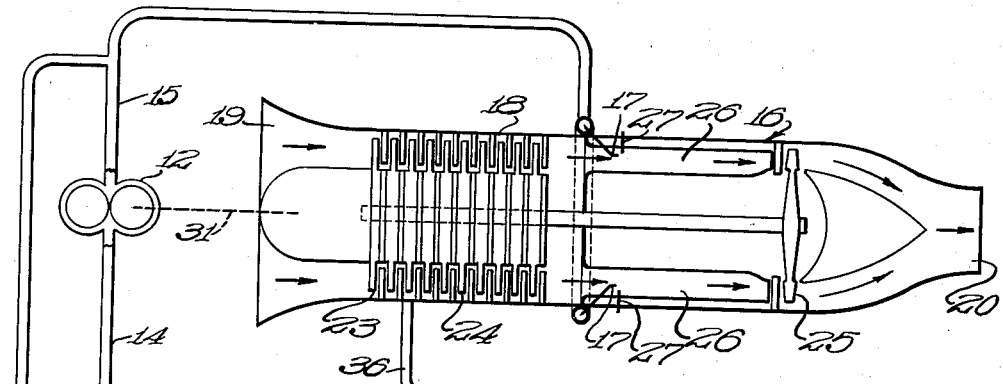
Figure 1 is a diagrammatic view of an aircraft fuel tank and engine showing a fuel system constructed in accordance with our invention arranged to supply fuel from the tank to the engine.
Figure 2:
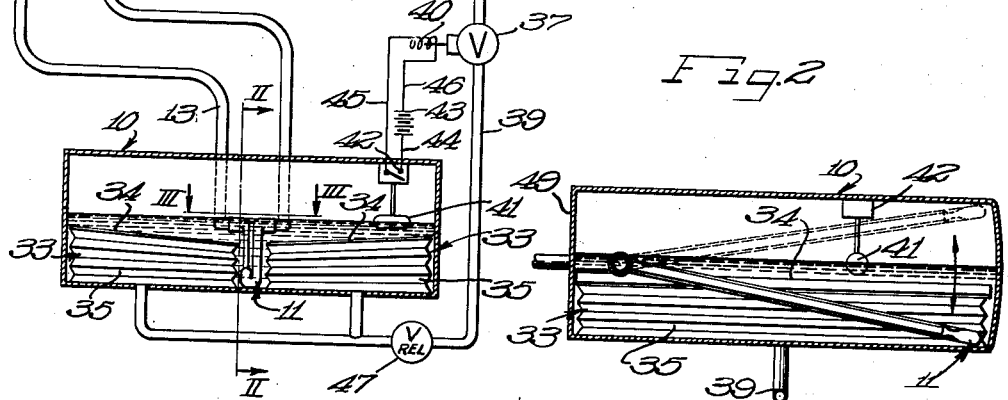
Figure 2 is a vertical sectional view taken substantially along line II—II of Figure 1.

The fuel system diagrammatically shown in Figure 1 of the drawing includes generally a fuel tank 10 having a floating jet pump 11 mounted therein and arranged to boost the pressure of a fuel pump 12 by aspirating fuel from the tank to an intake line 14 for said pump. Fuel of relatively high velocity is supplied to said jet pump through an inlet line 13 connected to divert fuel from a supply line 15 for an aircraft engine 16, and leading from the high pressure side of said pump. Said supply line is shown as being connected to fuel intakes 17, 17 of said aircraft engine 16.

The aircraft engine 16 may be of any well known form, but is herein diagrammatically illustrated as being a jet type of engine, suitable for use in aircraft and generally called a turbojet engine. This engine includes generally a cylindrical casing 18 having an open, flared forward end 19 and a restricted, open rear end 20. It also includes a compression chamber 23 having an axial flow compressor 24 mounted therein and driven from a turbine 25. Said turbine is driven from the heated gases caused by ignition of the fuel air mixture in combustion chambers 26 and directed from said combustion chambers against the blades thereof. The pump 12 may be driven from said compressor 24 by a shaft indicated generally by reference character 31, and only shown in a diagrammatic form since said pump may be independently driven if desired, and said pump and the drive thereto are no part of our present invention, and may be of any well known form.

The tank 10, as herein shown, has two expansible bladders 33, 33 mounted therein. Said bladders are shown as covering a major part of the horizontal area of said tank and as being arranged to expand when the level of the fuel drops below a predetermined level, to displace the fuel in said tank, and decrease the volume of said tank and thus increase the depth of the fuel in said tank. This assures that fuel may be pumped from said tank until the tank is substantially empty. Said bladders are herein shown as being spaced apart to receive the floating jet pump 11 therebetween, and while we show two bladders, it is readily apparent that one bladder or any number of bladders desired may be used.

Each bladder 33 is herein diagrammatically shown as being in the form of a bellows with a relatively stiff top portion 34 and flexible side walls 35, 35. Said side walls may be made from a suitable flexible material, resistant to the fuel contained in the tank, such as neoprene, and having permanent creases therein to permit the bladders to collapse flat when the tank is full or the fuel therein is above a predetermined level. Said walls of said bladder may be bonded to the tank bottom in a well known manner, and also may be suitably secured to said stiff top portion 34.

Fluid under pressure is bypassed from the compressor 24 of the turbo-jet engine 16 to inflate the bladders 33, 33, by means of a pressure line 36 leading from said compressor and connected to a solenoid operated valve 37. A pressure line 39 leads from said valve and is herein shown as leading through the bottom of the tank 10 to each of said bladders.

The solenoid operated valve 37 may be of any well known form, so arranged as to open when a coil 40 of the solenoid for operating said valve is energized, and to close when said coil is deenergized. Any well known form of control means may be provided to control operation of said valve, but as herein shown, we provide a float 41 connected with a switch 42 to control operation thereof, and closing said switch when the fuel drops below a predetermined level. One contact of said switch is connected to a battery 43 through a conductor 44. The other contact of said switch is connected to the coil 40 through a conductor 45. The other end of said coil is connected to the battery 43 by a conductor 46 connected to the other terminal of the battery from the conductor 44 to complete the circuit when said switch is closed. While we have herein shown a battery as being used to supply power to energize said solenoid, and close the valve 37, it is obvious that any other well known source of electric power supply may be used.

As the fuel in the tank 10 drops, the switch 42 will close to close the circuit to the coil 40. This will open the valve 37 to supply fluid under pressure to inflate the bladders when the engine 16 and compressor 24 are in operation. Inflation of said bladders 33, 33 will displace fuel in said tank 10 to such an extent as to raise the level thereof a substantial amount so that a major part of the fuel in said tank may be utilized to operate the engine 16. As fuel is displaced to a predetermined level the switch 42 will open. The valve 37 will thus close to hold fluid under pressure in said bladders 33, 33, and maintain them in an inflated condition. It should be understood that while we have herein shown the compressor 24 and the engine 16 as being the source of fluid under pressure to inflate the bladders 33, 33, that any other source of fluid under pressure desired may be used, such as fluid obtained from a separate compressor driven from the aircraft engine or independently driven, or fluid stored under pressure in a separate container. It should also be understood that any inert gas may be used to inflate said bladders.

In refilling the fuel tank 10 when empty or in a substantially empty condition, the engine 16 being stopped and the valve 37 being opened due to dropping of the float 41, fluid under pressure may be released from the bellows 33, 33, through the pressure line 39, valve 37, pressure line 36 and compressor 24, allowing said bladders to collapse both due to release of pressure therefrom and due to the weight of the fuel thereon entering said tank. A pressure relief bypass valve 47 is provided to bypass pressure to the atmosphere in cases where the engine 16 may be operating and fuel in the tank 10 may be so low that it will be impossible for the float 41 to close the valve 37.

Figure 3:
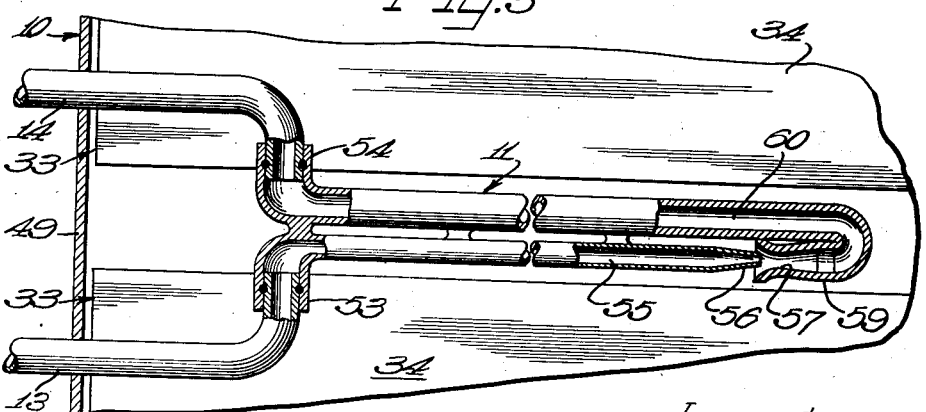
Figure 3 is an enlarged view of a floating fuel intake constructed in accordance with our invention with certain parts thereof broken away and shown in horizontal section.

Referring now to Figure 3 and the floating jet pump 11 for boosting the pressure of the pump 12 and taking fuel from the tank under negative "G" conditions and when the tank is inverted, the high velocity line 13, and discharge line 14 are herein shown as entering a side wall 49 of the tank 10. Said high velocity and discharge lines are shown as having 90° bends at their respective discharge and receiving ends, with said discharge and receiving ends facing and in alignment with each other. For convenience in assembly, said 90° bends may be detachable and the lines leading thereto may be capable of being disconnected within said tank. The facing ends of said high velocity and fuel intake lines 13 and 14, respectively, as herein shown, have outwardly facing receiving and discharge ends 53 and 54, respectively, of the jet booster pump 11 horizontally pivoted thereto. Suitable bearing mountings (not shown) may be provided for said ends 53 and 54 on said facing ends of said high velocity and fuel lines to permit free pivotal movement of said booster pump. Likewise, packing may be provided in said bearing mountings to prevent the loss of pressure that may be caused by the leakage of fuel thereby. Said booster pump, as herein shown, extends substantially to the opposite end of the tank from the high velocity and fuel discharge line, so as to rest on the tank bottom during normal operation of the aircraft and to pivot about the axis of pivotal connection of said pump to the inturned ends of said lines 13 and 14, and to rise to the top of the tank when the fuel is suspended in the upper portion of the tank during negative "G" operation or when the tank is inverted.

The jet pump, as herein shown, includes a high velocity passageway 55 leading to a restricted high velocity jet 56, which opens into the throat 57 of a venturi 59. The mouth of said venturi is open to fuel in the tank 10, so that fuel passing through the passageway 55 at a high velocity through the jet 56 will aspirate fuel in the tank 10 through the mouth of said venturi and through a passageway 60 extending along said venturi parallel to the passageway 55 and connected with the suction line 14 for the pump 12. The jet pump assembly 11 thus acts as a booster pump, boosting the pressure of the pump 12 and supplying fluid under pressure thereto and assuring a constant supply of fuel under pressure to fuel intakes 17, 17 of the aircraft engine 16 in various conditions of operation of the aircraft.

It may be seen from the foregoing that a new and improved fuel system, adapted for use in aircraft, has been provided which is so constructed and arranged that when fuel in the supply tank for the aircraft engine drops below a predetermined level the internal volume of the tank is reduced, to displace the remaining fuel therein and increase its depth and thus minimize the possibilities of the fuel pump losing its prime, and increasing the quantity of fuel which may be pumped from the tank over that which may be pumped from a conventional tank by a pump of the same type and capacity.

It may be further seen that the fuel system of our invention is so constructed and arranged as to effectively supply fuel to the aircraft engine when the aircraft is traveling under normal conditions or when the force of acceleration acts on the plane in such a manner as to bring into effect negative "G" conditions, and when the aircraft is in an inverted position and that this is attained by means of a floating fuel intake, herein shown as being a jet booster pump, so arranged as to rest on the bottom of the tank during normal operation of the plane and to rise to the top of the tank during negative "G" operations, assuring that the intake be continually submerged in the fuel in the tank during all conditions of operation of the aircraft.

While we have herein shown and described one form in which our present invention may be embodied, it will be understood that various modifications and variations thereof may be effected without departing from the spirit and scope of the novel concepts thereof.

We claim as our invention:

1. In a fuel system particularly adapted for use in aircraft, a fuel tank, a fuel delivery means adjacent the bottom of said tank and leading therefrom, an expansible bladder within said tank, fluid connections to said bladder, and a valve operable upon predetermined variations in the level of fuel in said tank and controlling the supply of fluid under pressure through said fluid connections to said bladder, to expand said bladder and decrease the internal volume of said tank upon a predetermined drop in the fuel level therein, and assure substantally full utilization of the fuel in said tank.

2. In a fuel system particularly adapted for use in aircraft, a fuel tank, a fuel delivery means adjacent the bottom of said tank, an expansible bladder within said tank, fluid connections to said bladder, a valve controlling the supply of fluid through said fluid connections to said bladder, and liquid level responsive means for operating said valve and operable upon a predetermined drop in the fuel level in said tank to open said valve, to supply fluid under pressure to expand said bladder, and to close said valve upon a predetermined rise in the level of fuel in said tank.

3. In a fuel system particularly adapted for use in aircraft, a fuel tank, a fuel delivery means adjacent the bottom of said tank, an expansible bladder within said tank, fluid connections to said bladder, a valve controlling the supply of fluid through said fluid connections to said bladder, and a float within said tank connected to control operation of said valve and effect opening of said valve upon a predetermined drop in the level of fuel in said tank, and closing said valve upon a predetermined rise in the level of fuel in said tank.

4. In a fuel tank particularly adapted for use in aircraft, fuel delivery means within said tank and leading therefrom, expansible means within said tank so constructed and arranged as to cover a major part of the bottom area thereof, a valve connected from a source of fluid under pressure to said expansible means, and liquid level means operable upon a predetermined drop in the level of fuel within said tank to supply fluid under pressure to open said valve to supply fluid under pressure to said expansible means, to expand said expansible means and decrease the internal volume of said tank and displace and assure substantially full utilization of the fuel therein.

5. In a fuel tank particularly adapted for use in aircraft, fuel delivery means in said tank and leading therefrom, expansible means within said tank so constructed and arranged as to cover a major part of the bottom area thereof, fluid connections leading from a source of fluid under pressure to said expansible means, a control valve in said fluid connections, and liquid level means operatively connected with said valve and operable upon a predetermined variation in the level of fuel within said tank to open said valve to supply fluid under pressure to said expansible means, and effect reduction in the volume of said tank and displace and raise the level of fuel therein, to assure substantially full utilization of the fuel in said tank.

T CYRIL NOON.
ROBERT J. ANDERSON.

References Cited in the file of this patent

UNITED STATES PATENTS

| Number | Name | Date |
|---|---|---|
| 1,871,055 | Hasbrouck | Aug. 9, 1932 |
| 1,939,611 | Purvis | Dec. 12, 1933 |
| 2,415,972 | Stinson | Feb. 18, 1947 |
| 2,432,025 | Lorenz | Dec. 2, 1947 |
| 2,446,612 | Sauser et al. | Aug. 10, 1848 |
| 2,519,393 | Noyes | Aug. 22, 1950 |